(12) United States Patent
Yokoyama et al.

(10) Patent No.: US 9,337,454 B2
(45) Date of Patent: May 10, 2016

(54) BATTERY PACK INCLUDING GAS ABSORPTION PORTION

(75) Inventors: Tomohiko Yokoyama, Osaka (JP); Masato Fujikawa, Osaka (JP); Akiko Yuasa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 229 days.

(21) Appl. No.: 13/643,830

(22) PCT Filed: Nov. 4, 2011

(86) PCT No.: PCT/JP2011/006173
§ 371 (c)(1),
(2), (4) Date: Oct. 26, 2012

(87) PCT Pub. No.: WO2012/073432
PCT Pub. Date: Jun. 7, 2012

(65) Prior Publication Data
US 2013/0040173 A1   Feb. 14, 2013

(30) Foreign Application Priority Data
Dec. 3, 2010   (JP) .................................. 2010-270806

(51) Int. Cl.
*H01M 2/12*   (2006.01)
*H01M 2/10*   (2006.01)

(52) U.S. Cl.
CPC .......... *H01M 2/1061* (2013.01); *H01M 2/1241* (2013.01)

(58) Field of Classification Search
CPC .......................... H01M 2/1061; H01M 2/1241
USPC ............................................................ 429/53
See application file for complete search history.

(56) References Cited

U.S. PATENT DOCUMENTS

| 2,922,833 A | * | 1/1960 | Philipp ........................... 429/56 |
| 2003/0049519 A1 | | 3/2003 | Ishida et al. |
| 2007/0164711 A1 | | 7/2007 | Kim et al. |
| 2011/0274951 A1 | * | 11/2011 | Yasui et al. ..................... 429/53 |

FOREIGN PATENT DOCUMENTS

| CN | 1399366 A | 2/2003 |
| JP | 04-004574 A | 1/1992 |

(Continued)

OTHER PUBLICATIONS

Nagasawa et al., Machine translation of JP 2006-228610 A, Aug. 2006.*

(Continued)

*Primary Examiner* — Sean P Cullen
(74) *Attorney, Agent, or Firm* — McDermott Will & Emery LLP (57) ABSTRACT

A battery pack comprising: a secondary battery including a safety valve; a gas absorption portion including a gas absorbent represented by zeolite and a container hermetically enclosing the gas absorbent; and a case housing the secondary battery and the gas absorption portion. The safety valve is configured to discharge a gas produced in the secondary battery at the time of abnormality. The container includes a principal surface facing the safety valve, for example, and when the gas is discharged, the container is unsealed by rupturing of at least the principal surface of the container by an effect of heat or pressure of the gas.

6 Claims, 5 Drawing Sheets

(56) References Cited

FOREIGN PATENT DOCUMENTS

| | | |
|---|---|---|
| JP | 04-162346 A | 6/1992 |
| JP | 04-162347 A | 6/1992 |
| JP | 2003-303579 A | 10/2003 |
| JP | 2004-152619 A | 5/2004 |
| JP | 2006-228610 A | 8/2006 |
| JP | 2007-200880 A | 8/2007 |
| JP | 2007-227171 A | 9/2007 |
| JP | 3161271 U | 7/2010 |
| JP | 2011-175844 A | 9/2011 |
| WO | WO-03/085754 A1 | 10/2003 |
| WO | WO 2010098067 A1 * | 9/2010 |

OTHER PUBLICATIONS

Chinese Office Action issued in Chinese Patent Application No. 201180018817.6 mailed Jul. 2, 2014.

International Search Report issued in International Patent Application No. PCT/JP2011/006173 dated Nov. 29, 2011.

* cited by examiner

BATTERY PACK INCLUDING GAS ABSORPTION PORTION

RELATED APPLICATIONS

This application is the U.S. National Phase under 35 U.S.C. §371 of International Application No. PCT/JP2011/006173, filed on Nov. 4, 2011, which in turn claims the benefit of Japanese Application No. 2010-270806, filed on Dec. 3, 2010, the disclosures of which Applications are incorporated by reference herein.

TECHNICAL FIELD

The present invention relates to a battery pack that houses a secondary battery in a case, and particularly relates to an improvement in the structure of the battery pack.

BACKGROUND ART

In recent years, as portable apparatus such as notebook personal computers and cellular phones has been spreading, demand for batteries as power sources thereof has been increasing. In particular, demand for small and lightweight secondary batteries that have high energy density and that can be charged and discharged repeatedly has been increasing.

In order to meet such demand, research and development of secondary batteries have been conducted actively. As portable apparatus has higher functions, the secondary batteries have more energy, and proportionally, amount of heat produced at the time of abnormality increases. When a battery produces heat abnormally, a gas is produced in the battery and internal pressure of the battery increases. Therefore, a safety valve for discharging the gas to the outside of the battery when the internal pressure exceeds a predetermined value is provided in the battery.

Various studies have been made on the safety of battery packs housing such batteries. For example, Patent Literature 1 proposes to cool a high-temperature gas discharged from a battery and discharge the same to the outside of a battery pack. Specifically, it proposes to improve the structure of a case having an exhaust hole. The case is composed of a battery-housing portion, a cylindrical filter portion, and a partition having a vent hole and separating the battery-housing portion and the filter portion. The cylindrical filter portion is composed of a cylindrical fire extinguisher-filled portion and heat insulator-filled portions disposed on both ends of the fire extinguisher-filled portion.

CITATION LIST

Patent Literature

[PTL 1] Japanese Laid-Open Patent Publication No. Hei 4-162346

SUMMARY OF INVENTION

Technical Problem

In the battery pack of Patent Literature 1, when the battery in the battery-housing portion discharges a high-temperature gas, the high-temperature gas passes through the vent hole of the partition and the filter portion and is discharged to the outside of the case. However, the high-temperature gas filled in the battery-housing portion is not likely to be discharged so rapidly to the outside of the battery-housing portion. Consequently, the temperature in the battery-housing portion tends to rise abnormally and a high-temperature condition persists in the battery-housing portion, which may damage the battery-housing portion. If the battery-housing portion is damaged, equipment surrounding that portion may be affected badly.

Solution to Problem

An aspect of the present invention relates to a battery pack comprising: a secondary battery including a safety valve being configured to discharge a gas at the time of abnormality; a gas absorption portion absorbing the gas; and a case housing the secondary battery and the gas absorption portion, the gas absorption portion including a gas absorbent and a container enclosing the gas absorbent, and the container being configured to be unsealed or ruptured by the gas discharged from the secondary battery.

Advantageous Effects of Invention

According to the present invention, it is possible to suppress damage to the case of the battery pack caused by a gas discharged from the battery at the time of abnormality. Therefore, a battery pack having high safety can be provided.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

The present invention relates to a battery pack comprising: a secondary battery including a safety valve; a gas absorption portion including a gas absorbent and a container hermetically enclosing (preferably, pressure reducing or vacuum-sealing) the gas absorbent; and a case housing the secondary battery and the gas absorption portion. Herein, the safety valve discharges a gas produced in the secondary battery at the time of abnormality. Then, the container is configured to be unsealed when the gas is discharged.

The container hermetically enclosing the gas absorbent preferably has a principal surface facing the safety valve. Since the principal surface facing the safety valve crosses the discharge direction of the gas, it is likely to be affected by the heat or pressure of the gas. In this case, by using the heat or pressure of the gas, at least the principal surface can be ruptured easily, and as a result, the container can be unsealed or ruptured.

In a preferred embodiment of the present invention, at least a part of the principal surface is formed of a sheet including a thermoplastic resin. Such a sheet is likely to melt or shrink when the gas is discharged. Therefore, the principal surface can be ruptured easily and the container can be unsealed or ruptured.

The principal surface may have a thin portion having a thinner thickness than the other portion of the surface. Since such a thin portion has relatively lower strength than the other portion of the surface, it can be ruptured more easily.

A rupture-assisting element having a projection that protrudes toward the principal surface can be provided between the container hermetically enclosing the gas absorbent and the secondary battery.

In view of preventing leakage of the gas to the outside of the case, or damage to equipment surrounding the case by the high-temperature gas, it is desirable that the secondary battery and the gas absorption portion are hermetically enclosed in the case. Even when the gas is discharged from the safety valve of the secondary battery, increase in the internal pressure of the battery pack can be suppressed by the presence of the gas absorption portion.

The present invention will be described specifically.

When abnormality such as external short circuit, etc. occurs in a secondary battery such as a lithium ion secondary battery, the battery may produce heat abnormally and a considerable amount of gas may be produced in the battery. When a considerable amount of gas is produced in the battery, the internal pressure of the battery increases rapidly. Therefore, a safety valve leading the gas to the outside of the battery is provided in the secondary battery. The safety valve opens when the internal pressure of the battery exceeds a predetermined value and the gas is discharged to the outside of the battery. The discharged gas often has relatively a high temperature and often includes combustible components.

The shape of the secondary battery is cylindrical or prismatic, for example, but the shape of the battery is not particularly limited. For example, a flat battery including a sheet-shaped power-generating element and a case formed of a flexible sheet that houses the power-generating element is applicable. In cylindrical and prismatic batteries, the safety valve is generally formed on one end face of a cylindrical or prismatic battery. The structure of the safety valve is not particularly limited and includes, for example, a hole for discharging the gas and a valve for closing the hole.

A battery pack in accordance with the present invention includes a gas absorption portion in a case thereof. The gas absorption portion includes a gas absorbent that absorbs a gas discharged from the battery and a container that encloses the gas absorbent. During normal times, the gas absorbent is hermetically enclosed (preferably, pressure reducing or vacuum-sealed) in the container. Therefore, even when the battery pack is stored for a long time, the gas absorbent does not come in contact with any gas, and also, the gas absorbability is not deteriorated. In contrast, at the time of abnormality when the safety valve opens, the container is unsealed by the gas discharged from the battery, which makes the gas absorbent come in contact with the gas. Consequently, excellent gas absorbability can be exhibited.

By the presence of the gas absorption portion, the gas is rapidly absorbed by the gas absorbent even when high-temperature gas is discharged from the battery at the time of abnormality. Consequently, it is possible to suppress a considerable temperature increase in the case, by high-temperature gas. Also, it is possible to suppress damage to the case by the high-temperature gas discharged from the battery. Further, the equipment surrounding the case is not affected badly by damage to the case. Therefore, the safety of the battery pack is improved.

The container of the gas absorption portion is configured to be unsealed when the secondary battery discharges the gas. For example, the container is unsealed due to its contact with the high-temperature gas. In this case, it is desirable that at least a part of the surface of the container is exposed in the case. Also, in order to unseal the container rapidly when the gas is discharged, it is preferable that the container is formed of a material that melts or heat shrinks when it reaches about the temperature of the gas discharged from the safety valve (e.g. temperature of 100 to 700° C.). Further, it is preferable that the gas absorption portion and the battery do not come in contact with each other, so that, even when the battery is producing heat, the container is not unsealed at a point where the high-temperature gas is not yet discharged from the battery.

It is desirable that the gas absorption portion is disposed in the case such that the gas absorbent can absorb effectively the high-temperature gas in the condition that the container is unsealed. For example, the gas absorption portion is preferably disposed such that the principal surface of the container of the gas absorption portion faces the safety valve of the battery. In the case of a cylindrical battery and a prismatic battery discharging a high-temperature gas from the safety valve formed on one end face thereof, the principal surface of the container of the gas absorption portion is preferably disposed such that it faces the one end face of the battery.

It is preferable that the inside of the case is in a hermetically sealed condition such that the high-temperature gas does not leak to the outside of the battery pack. Conventionally, an exhaust hole for discharging the high-temperature gas discharged from the battery to the outside of the case is provided in the case. However, in the present invention, since the gas absorption portion disposed in the case absorbs the high-temperature gas, there is no need for providing an exhaust hole in the case. Therefore, the case can be in a hermetically sealed condition, and leakage of the high-temperature gas to the outside of the case can be suppressed. Also, the equipment surrounding the case is not damaged by the high-temperature gas.

The number of the secondary battery housed in the case may be one or more. When two or more batteries are housed in the case, one of the adjacent batteries supposedly discharges a high-temperature gas at the time of abnormality. Even in such a case, the gas absorption portion absorbs rapidly the high-temperature gas, thereby reducing the effect of the high-temperature gas on the other battery. Thus, damage to the other battery can be avoided.

When two or more batteries are housed in the case, the batteries are arranged such that side faces of the adjacent batteries face each other, for example. The two or more batteries are preferably arranged in a row in the same direction with axial directions thereof in parallel. By arranging the two or more batteries in such a manner, one gas absorption portion can be disposed so as to face all the end faces having an exhaust hole of the two or more batteries together. When one battery produces heat at the time of abnormality, in order to prevent the heat from transferring to the other batteries, it is preferable to dispose the adjacent batteries apart from each other or provide a separator that separates the adjacent batteries from each other. A material having excellent heat insulation properties is used for the separator.

Embodiments of the present invention will be described by referring to drawings. However, the present invention is not limited to the following embodiments and can be practiced with modification as appropriate within a range of not modifying the gist thereof.

(Embodiment 1)

Figure 1:
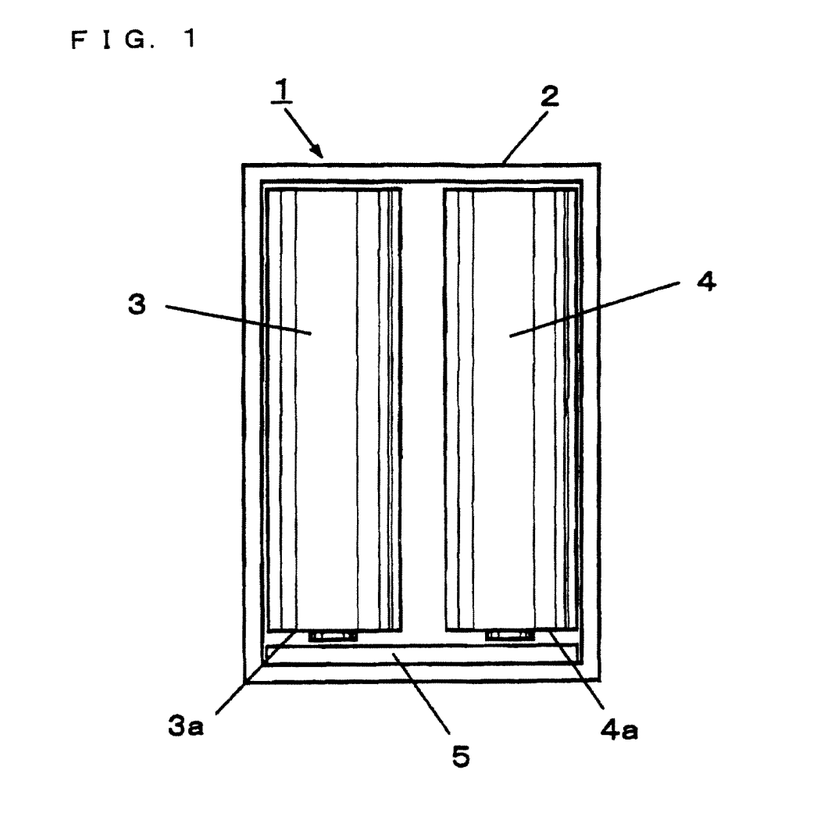
[FIG. 1] A top view illustrating a state of a battery pack in accordance with Embodiment 1 of the present invention from which a lid is removed

As illustrated in FIG. 1, a battery pack 1 of the present embodiment includes batteries 3 and 4 which are cylindrical secondary batteries and a case 2 made of resin that houses the batteries 3 and 4. A sealing plate is provided on each of end faces 3a and 4a (end faces having positive terminal) on one side of the secondary batteries 3 and 4, the sealing plate including a safety valve (not illustrated) which is designed to discharge a gas when the internal pressure of the battery exceeds a predetermined value.

Figure 2:
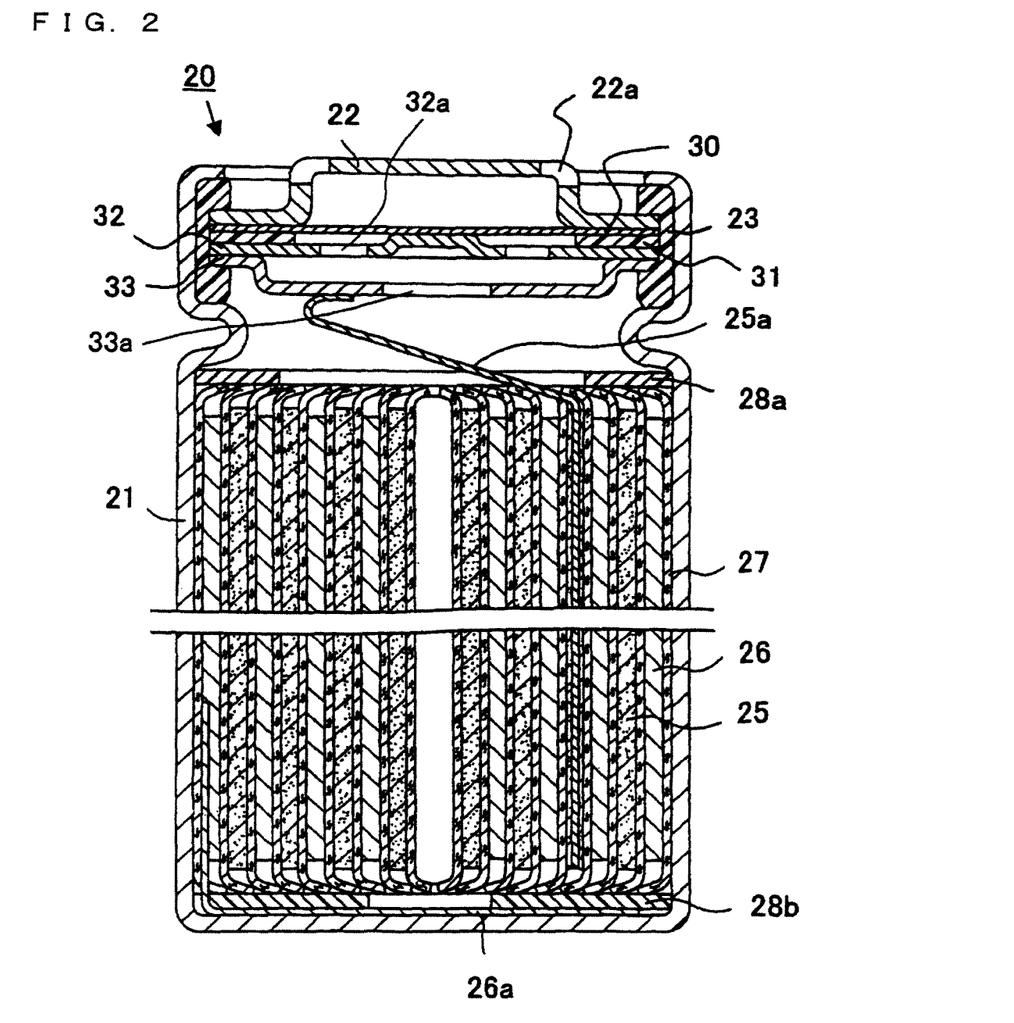
[FIG. 2] A vertical sectional view of a cylindrical lithium ion secondary battery as an example of a cylindrical secondary battery

As the cylindrical secondary batteries 3 and 4, a cylindrical lithium ion secondary battery 20 as illustrated in FIG. 2 is used, for example. In the secondary battery 20 illustrated in FIG. 2, an electrode group in which a positive electrode 25 and a negative electrode 26 are wound with a separator 27 disposed therebetween is housed in a cylindrical battery case 21 having a bottom. A cross section perpendicular to a winding axis of the electrode group has a roughly circular shape. The electrode group includes a non-aqueous electrolyte. Insulating rings 28a and 28b are respectively disposed on upper and lower portions of the electrode group. The negative electrode 26 is electrically connected with the battery case 21 via a negative lead 26a. The sealing plate is disposed in an opening of the battery case 21 with a gasket 23 disposed therebetween.

Next, the structure of the sealing plate including the safety valve will be described.

The sealing plate includes a cap-shaped positive terminal plate 22, a metal thin plate 30 in contact with a flange portion of the positive terminal plate 22, and a medium plate 32 made of metal. The medium plate 32 has in the center thereof a projection in contact with the metal thin plate 30; and holes 32a formed in the periphery of the projection. An insulating plate 31 is disposed between the peripheral portion of the metal thin plate 30 and the peripheral portion of the medium plate 32. The medium plate 32 is electrically connected with the positive electrode 25, via an underplate 33 made of metal having a hole 33a in the center thereof and a positive lead 25a connected with a lower surface of the underplate 33. A PTC (Positive temperature Coefficient) element may be provided between the positive terminal plate 22 and the metal thin plate 30. The PTC element has a characteristic of rapidly increasing resistance and cutting off current when it reaches a predetermined temperature. The positive terminal plate 22 constitutes the end faces 3a or 4a.

Herein, when a large amount of gas is produced in the battery and the internal pressure of the battery increases, the metal thin plate 30 is pushed upward and distorted. When the internal pressure of the battery exceeds a predetermined value, the metal thin plate 30 ruptures and the gas is discharged therefrom to the outside of the battery through an exhaust hole 22a of the positive terminal plate 22. That is, the holes 32a of the medium plate 32 and the metal thin plate 30 covering the holes 32a act as a safety valve discharging the gas at the time of abnormality.

In the case 2, a sheet-shaped gas absorption portion 5 facing the end faces 3a and 4a (i.e. facing the safety valve) of the batteries 3 and 4 is arranged. The gas absorption portion 5 is disposed along an inner side face of the case 2. The battery pack 1 includes a member electrically connecting the batteries 3 and 4, and also, a terminal portion for conducting electricity to the outside of the battery pack 1, which are not illustrated in the drawings.

The batteries 3 and 4 are arranged in a row with the axial directions thereof in parallel. However, the side faces of the batteries 3 and 4 are apart from each other. Therefore, even when one of the adjacent batteries produces heat at the time of abnormality, the heat is not likely to be transferred to the other battery. In view of space effectiveness in the case, the distance between the adjacent batteries (in FIG. 1, distance between side faces) is preferably 2 mm or less.

The case 2 is composed of a case body having a shallow prismatic shape, with a bottom and a quadrangular-shaped lid covering an opening of the case body. In order to fix the batteries 3 and 4 in the case 2, concave portions corresponding to the side faces of the batteries 3 and 4 may be formed on an inner bottom face of the case body. The case body may be integrated with the lid by thermal welding, etc. There is no need to form an exhaust hole in the case body and the lid for discharging the gas to the outside of the case. That is, the inside of the case 2 may be in a hermetically sealed condition.

Figure 3:
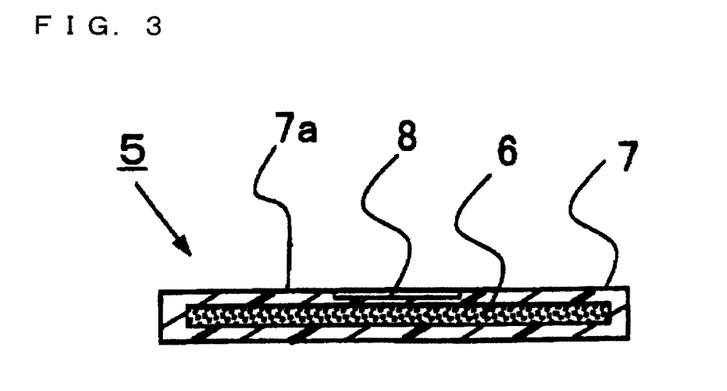
[FIG. 3] A transverse sectional view of a gas absorption portion 5 of FIG. 1

As illustrated in FIG. 3, the sheet-shaped gas absorption portion 5 includes a gas absorbent 6 and a container 7 that encloses the gas absorbent 6. In view of space effectiveness and gas absorbability in the case, the gas absorption portion preferably has a thickness of 0.5 to 5 mm, for example. In the case of unsealing the container 7 by melting or heat shrinkage, the container 7 is preferably formed of a material that melts or heat shrinks at the temperature of the high-temperature gas (e.g. temperature of 100 to 700° C.)

As the material for the container 7, a sheet including a thermoplastic resin is preferable, for example. As such a sheet, laminate film including metal foil (aluminum foil, etc.) and thermoplastic resin films sandwiching the metal foil is preferable in view of having excellent gas barrier property. As the thermoplastic resin film, polypropylene, polyethylene, polyethylene terephthalate, and polyamide are used, for example. In view of securing both strength and reliable rupture of the container, the laminate film preferably has a thickness of 80 to 120 µm.

The sheet including a thermoplastic resin may be thermoplastic resin film not including metal foil. As such thermoplastic resin film, polypropylene, polyethylene, polyethylene terephthalate, and polyimide may be used as well. The thermoplastic resin film not including metal foil preferably has a thickness of 25 to 100 µm.

Although the entire container may be formed of a sheet including a thermoplastic resin, only a part of the container may be formed of such a sheet. For example, at least a part of the principal surface of the container that faces the safety valve of the secondary battery may be formed of a sheet including a thermoplastic resin. In such a case, the rest of the container should not necessarily be a flexible material such as a sheet and may be a plate material, for example.

The gas absorbent absorbs gases such as CO and $CO_2$ discharged from the batteries. Zeolite is used as the gas absorbent, for example, but there is no particular limitation. Zeolite is classified into A-type zeolite, L-type zeolite, β-type zeolite, MFI-type zeolite, faujasite-type zeolite, etc. according to the crystal structure. Among these types, MFI-type zeolite is preferable in view of having excellent gas absorbability. Examples of MFI-type zeolite include ZSM-5 type zeolite and ZSM-11 type zeolite. Among these types, ZSM-5 type zeolite that has excellent absorbability of the high-temperature gas is more preferable.

Figure 4:
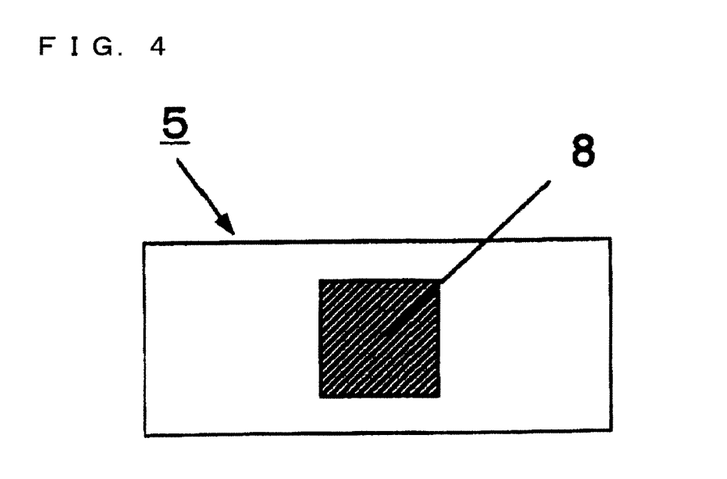
[FIG. 4] A front view of the gas absorption portion 5 of FIG. 1

As illustrated in FIGS. 3 and 4, in the container 7 there is a thin portion 8 in the center portion of one principal surface 7a on which the high-temperature gas is to be blown, the thin portion 8 (i.e., first portion) being of a material made thinner than at the other portion (i.e., second portion) of the surface. When the high-temperature gas discharged from the end face of the battery reaches the thin portion 8 rapidly, the container 7 is unsealed starting from the thin portion. Since the container 7 is unsealed starting from the thin portion 8, the portion to be unsealed can be controlled easily.

In view of securing both strength and reliable rupture of the container, a ratio: $T_2/T_1$ of a thickness $T_2$ of the thin portion of the container, relative to a thickness $T_1$ of the portion other than the thin portion of the container is preferably 0.25 to 0.5, more preferably 0.25 to 0.35. From the same viewpoint, the thickness of the thin portion is preferably 20 to 50 µm. In the case of forming the thin portion, the thickness of the portion other than the thin portion is preferably 80 to 120 µm. Also, in view of securing reliable rupture of the container, the area of the thin portion 8 preferably is about the same as that of a rectangle of (5 to 40 mm)×(5 to 40 mm).

In this embodiment, a thin portion is formed only in one place in the gas absorbing portion, that is, in the center portion of the principal surface on which the high-temperature gas is to be blown. However, the place where the thin portion is formed and the number thereof are not limited thereto. It is allowable, as long as the thin portion is formed in one or more places on one principle surface of the gas absorption portion on which the high-temperature gas is to be blown. For example, the thin portion may be formed in front of both the end faces 3a and 4a of the batteries 3 and 4. Also, the entire container may be constituted by the thin portion.

In the battery pack 1, when the battery 3 discharges a high-temperature gas from the end face 3a at the time of abnormality, the gas absorption portion 5 is heated by the heat and the thin portion 8 melts or heat shrinks, thereby unsealing the container 7. By the unsealing of the container, the gas absorbent can come in contact with the high-temperature gas, and the gas absorbent absorbs the high-temperature gas. Thus, the case is prevented from being filled with the high-temperature gas, which suppresses rapid increase in the temperature in the case. Also, the case would not be damaged as when the high-temperature gas fills the case. Further, when the case is hermetically sealed, leakage of the high-temperature gas to the outside of the battery pack is also suppressed.

The battery pack is produced, for example, through the steps of: (A) preparing the case; (B) hermetically enclosing (including vacuum sealing) the gas absorbent in the container to obtain the gas absorption portion; and (C) housing the gas absorption portion and the secondary battery in the case.

In the step (A), the case is produced by resin molding, for example. As the resin material used for molding the case, it is preferable to use an incombustible resin of V-0 or higher in UL-94 standard. In "Guidebook Regarding Safe Use of Lithium Ion Secondary Batteries in Notebook PC" (Japan Electronics and Information Technology Industries Association, Battery Association of Japan), it is recommended that the above incombustible resin is used as the resin material of the case. A fireproofed polymer material is preferably used as the component of the case. Preferable examples of such a polymer material include fireproofed polycarbonate (PC), polypropylene (PP), and polyethylene terephthalate (PET). In the step (A), for example, a prismatic case body having a bottom and a lid having a quadrangular plate shape that closes an opening thereof are prepared.

In the step (B), for example, after ZSM-5 type zeolite is filled from an opening of a bag-shaped aluminum laminate film, the opening is closed by thermal welding while the inside of the bag is decompressed. In the case of forming a thin portion in the aluminum laminate film, for example, aluminum foil, in which a predetermined area corresponding to the thin portion is formed thinly beforehand, should be prepared; and then, thermoplastic resin film may be adhered on both surfaces of the aluminum foil. In order to form a thin portion on aluminum foil, an indenter having a predetermined shape may be pressed onto the aluminum foil. In the alternative, a thin portion may be formed on the aluminum laminate film, by pressing an indenter having a predetermined shape onto a predetermined area corresponding to the thin portion, after the aluminum laminate film is produced.

In the step (C), for example, after the battery and the gas absorption portion are housed in the prismatic case body having a bottom, the peripheral portion of the lid having a quadrangular plate shape is mounted on an opening end portion of the case body and the joint thereof is thermal welded. Thus, the battery and the gas absorption portion can be housed in the case. As a method of fixing the gas absorption portion in the case, for example the gas absorption portion may be adhered to an inner surface of the case body with an adhesive, etc. In the alternative, a groove for fitting with the peripheral end portion of the gas absorption portion may be formed on the inner surface of the case body.

The positive terminals of the batteries 3 and 4 are provided with a member electrically connecting the batteries, which is not illustrated in the drawings. That is, a connection member between the batteries is disposed between the gas absorption portion 5 and the batteries 3 and 4. It is desirable that such a connection member is disposed so as not to cover the thin portion 8 as much as possible, such that rapid unsealing of the container and rapid gas absorption are not hindered. For example, a strip-shaped lead member should be provided so as to extend upward from the bottom portion of the case 2 along the end faces 3a and 4a of the batteries 3 and 4 such that it does not cover the thin portion 8.

Figure 5:
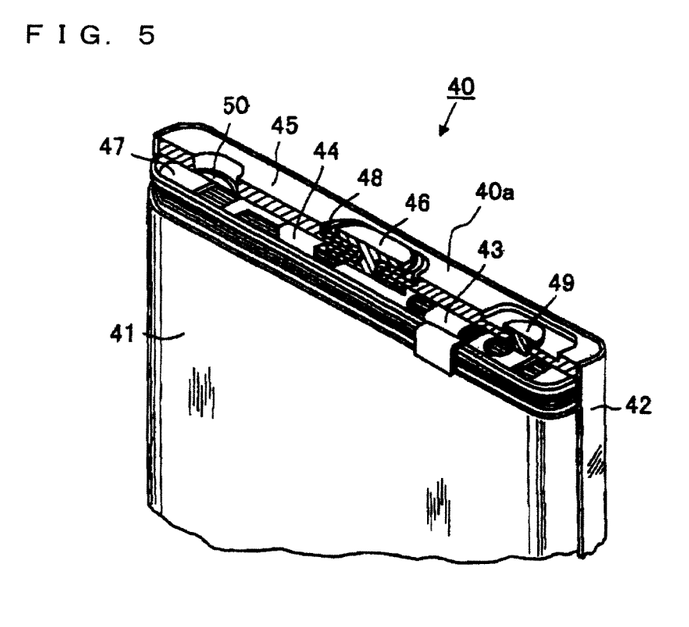
[FIG. 5] A partially cut-away perspective view of a prismatic lithium ion secondary battery as an example of a prismatic secondary battery

Although cylindrical secondary batteries are used in this embodiment, prismatic secondary batteries may be used as well. As a prismatic secondary battery, for example a prismatic lithium ion secondary battery 40 as illustrated in FIG. 5 can be given. In the secondary battery illustrated in FIG. 5, an electrode group 41 is housed in a prismatic battery case 42 having a bottom. The electrode group 41 is formed by winding a positive electrode and a negative electrode with a separator interposed therebetween, and a cross section perpendicular to a winding axis thereof has a roughly oval shape. The electrode group 41 is impregnated with an electrolyte. A roughly rectangular sealing plate 45 is disposed on an opening of the battery case 42. The sealing plate 45 includes: a negative terminal 46 inserted into a hole provided in the center portion thereof, with an insulating gasket 48 therebetween; a sealing plug 49 for closing an injection hole; and a safety valve 50 composed of a metal thin plate, for closing an exhaust hole. A positive lead 43 extending from the positive electrode is connected with a lower surface of the sealing plate 45. A negative lead 44 extending from the negative electrode is connected with the negative terminal 46. An insulator 47 for preventing electrical contact of the positive lead 43 or the negative lead 44 with a battery case 42 is disposed on an upper portion of the electrode group 41.

When a large amount of gas is produced in the battery and the internal pressure of the battery exceeds a predetermined value, the safety valve 50 ruptures and the gas inside the battery is discharged from the exhaust hole to the outside of the battery. In this case, the gas absorption portion 5 may be disposed such that the principal surface 7a of the container 7 having the thin portion 8 faces an end face 40a of the prismatic battery 40 constituted by the sealing plate 45.

(Embodiment 2)

Figure 6:
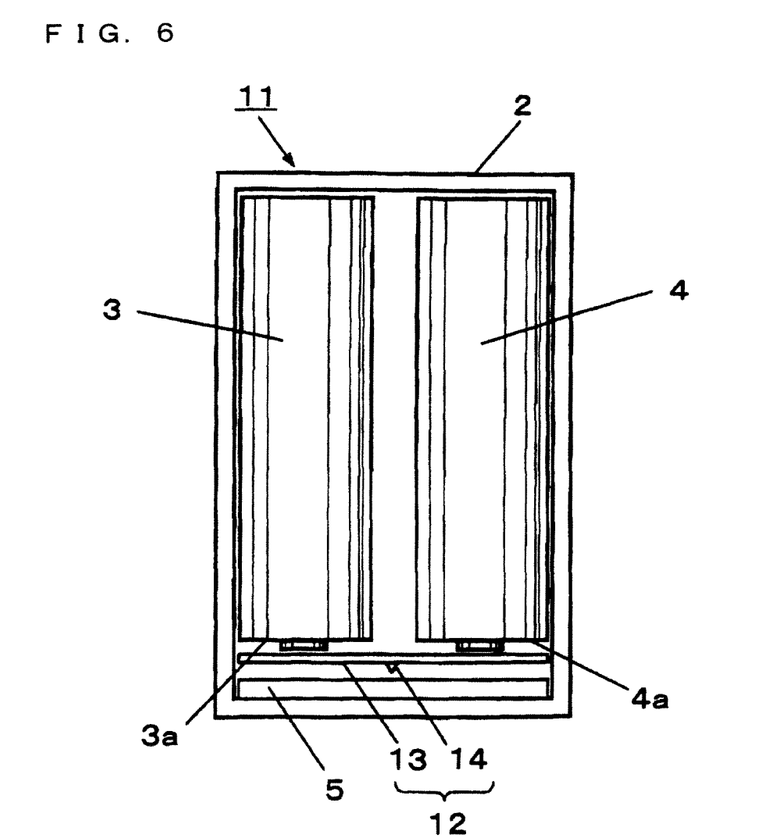
[FIG. 6] A top view illustrating a state of a battery pack in accordance with Embodiment 2 of the present invention from which a lid is removed
Figure 7:
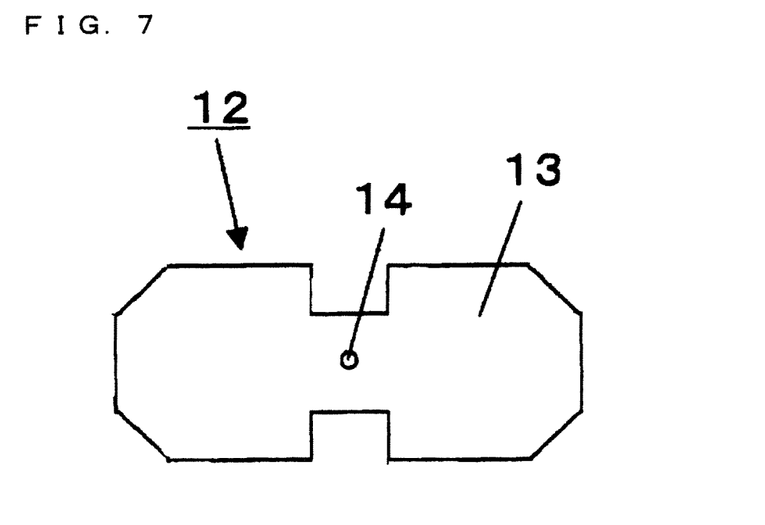
[FIG. 7] A front view of a rupture-assisting element 12 of FIG. 6

As illustrated in FIGS. 6 and 7, in a battery pack 11 in accordance with this embodiment, a rupture-assisting element 12 for rapidly unsealing the container when the high-temperature gas is discharged from the battery, is disposed between the batteries 3 and 4 and the gas absorption portion 5. Other than the above, the battery pack 11 is the same as that of Embodiment 1.

The rupture-assisting element 12 includes a plate material 13 made of metal, etc. and a projection 14 having, for example, a cone shape, which protrudes toward the thin portion 8 in the center of one principal surface of the plate material 13. The projection 14 is fixed to the plate material 13 by welding, for example.

The rupture-assisting element 12 is disposed without being fixed in a space between the batteries 3 and 4 and the gas absorption portion 5, such that the rupture-assisting element 12 can move to the side of the gas absorption portion 5. A space larger than the size totaling the thickness of the plate material 13 and the height of the projection 14, is provided between the batteries 3 and 4 and the gas absorption portion 5. During normal times, even when the tip of the projection comes in contact with the thin portion due to vibration, etc., the force thereof is sufficiently smaller than the force with which the tip of the projection pushes the thin portion when the battery discharges high-temperature gas. If the thickness of the thin portion is, for example, 30 μm or more, the projection does not penetrate the thin portion unintentionally due to vibration, etc. at ordinary times.

In the case of using the rupture-assisting element 12, the material of the container is preferably aluminum laminate film in view of securing both strength and reliable rupture of the thin portion. In view of space effectiveness inside the case and strength of the case, the thickness of the plate material 13 is preferably 0.5 to 2 mm. In view of strength and processability, the plate material 13 is preferably made of stainless steel plate. In view of space effectiveness inside the case and reliable rupture of the container, the projection 14 preferably has a bottom diameter of 0.5 to 2 mm and a height of 0.5 to 2 mm.

Notched portions are formed in areas of the plate material 13 that does not face the front of the end faces 3a and 3b of the batteries, such that the high-temperature gas can easily comes in contact with the gas absorption portion. Specifically, notched portions are formed at the four corners and on upper and lower portions relative to the projection, of the plate material 13. An insulating plate may be adhered, as necessary, on the other surface of the plate material 13 that does not have the projection.

Since the internal pressure of the battery is extremely high immediately after the safety valve opens, the high-temperature gas spouts out vigorously from the battery and the rupture-assisting element 12 is pushed onto the gas absorption portion 5 by the pressure of the high-temperature gas. Then, the projection 14 penetrates the thin portion, and the container begins to rupture from the penetrated portion. Thereafter, the rupturing is enlarged further by the heat of the high-temperature gas. The rupture-assisting element 12 pushes onto the gas absorption portion 5 only at the moment when the safety valve opens, so it is a very short time. Afterwards, the force of the discharged high-temperature gas reduces, and the rupture-assisting element 12 no longer pushes onto the gas absorption portion 5. Therefore, the gas absorption portion can rapidly absorb the high-temperature gas.

In the case of electrically connecting the batteries 3 and 4 in parallel, the plate material 13 may be formed of a metal plate and this may be used as the member for electrically connecting the respective positive terminals of the batteries 3 and 4.

The present invention will be described by referring to Examples. However, the present invention is not limited to these examples.

EXAMPLE 1

A battery pack in accordance with Embodiment 1 is produced.

As the secondary batteries 3 and 4, cylindrical lithium ion secondary batteries (diameter: 18 mm, height: 65 mm, capacity: 2,600 mAh) were used. As the case 2, a case made of polycarbonate (PC) (length: 70 mm, width: 41 mm, height: 21 mm) was used.

As the gas absorption portion 5, a sheet-shaped gas absorption portion (width: 40 mm, height: 20 mm, thickness: 1 mm, weight: 1.2 g) formed by vacuum sealing ZSM-5 type zeolite (CBV3024E, available from Zeolyst International) in aluminum laminate film (Standard 5, available from Showa Denko Packaging K.K.) having a thickness of 100 μm was used.

At this time, the thin portion 8 in which the thickness of the aluminum laminate film was made as thin as 30 μm was formed in a predetermined area (width: 10 mm, height: 10 mm) in the center portion on the principal surface of the gas absorption portion that is to face the secondary batteries. The thin portion 8 is formed by pressing an indenter having a predetermined shape onto the aluminum laminate film. After the gas absorption portion and the secondary batteries were housed in the case body, the lid was fitted to the opening of the case body. However, the case body and the lid were not thermally welded, for evaluation tests as will be described later.

EXAMPLE 2

A battery pack in accordance with Embodiment 2 was produced.

For the secondary batteries 3 and 4, the case 2, and the gas absorption portion 5, the same ones as those used in Example 1 were used. For the rupture-assisting element 12, a plate material 13 (width: 40 mm, height: 20 mm, thickness: 1 mm) made of stainless steel having a cone-shaped projection 14 (bottom diameter: 2 mm, height: 2 mm) was used. A battery pack was produced in the same manner as in Example 1, except for above.

COMPARATIVE EXAMPLE 1

A battery pack was produced in the same manner as in Example 1, except that the gas absorption portion was not disposed in the case.

[Evaluation]

With regard to the battery packs of Examples 1 and 2 and Comparative Example 1, the battery 3 was subjected to external short circuit in an environment of 25° C. At this time, the temperature in the case was monitored by using a thermocouple and the maximum temperature was measured. The thermocouple was disposed on an inner side face of the case that faces the side face of the battery 3. In order to fix the case body and the lid, a binding member was attached to the periphery of the battery pack for convenience. Evaluation results are shown in Table 1.

TABLE 1

|  | Maximum temperature |
|---|---|
| Example 1 | 26° C. |
| Example 2 | 28° C. |
| Comparative Example 1 | 93° C. |

As shown in FIG. 1, in the battery packs of Examples 1 and 2, since the high-temperature gas discharged from the battery 3 was rapidly absorbed by the gas absorption portion in the case, the temperature increase in the case was suppressed remarkably and excellent safety was exhibited in comparison with the battery pack of Comparative Example 1.

INDUSTRIAL APPLICABILITY

Since the battery pack in accordance with the present invention does not cause leakage of the high-temperature gas discharged from the battery to the outside of the battery pack at the time of abnormality, it can be suitably used as a power source for small-sized apparatus such as cellular phones and a power source for driving electric automobiles, etc.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A battery pack comprising:
   a secondary battery including a safety valve;
   a gas absorption portion including a gas absorbent and a container hermetically enclosing the gas absorbent; and
   a case housing the secondary battery and the gas absorption portion,
   wherein the safety valve is configured to discharge a gas produced in the secondary battery upon occurrence of an abnormality, and the container is configured so as to open when the gas discharged from the secondary battery contacts the container, and
   wherein the gas absorption portion and the secondary battery do not come in contact with each other, and an inside of the case is in a hermetically sealed condition.

2. The battery pack in accordance with claim 1, wherein the gas absorbent is zeolite.

3. The battery pack in accordance with claim 1, wherein the container includes a principal surface facing the safety valve, and the container is opened by rupturing of at least the principal surface by means of heat or pressure of the gas.

4. The battery pack in accordance with claim 3, wherein at least a part of the principal surface is formed of a sheet including a thermoplastic resin, and the sheet melts or shrinks when the gas is discharged.

5. The battery pack in accordance with claim 3, wherein the principal surface includes a first portion and a second portion, the first portion having a thickness which is thinner than a thickness of the second portion, the second portion forming the remainder of the principal surface other than the first portion.

6. The battery pack in accordance with claim 3, further including a rupture-assisting element between the container and the secondary battery, the rupture-assisting element having a projection that protrudes toward the principal surface.

* * * * *